(12) United States Patent
McDonald et al.

(10) Patent No.: US 6,970,540 B1
(45) Date of Patent: Nov. 29, 2005

(54) DETECTION OF COMMON INFORMATION ELEMENTS IN PSTN CALL PROCESSING PATTERNS

(75) Inventors: Randy M. McDonald, Roswell, GA (US); Terry R. Droke, Woodstock, GA (US); Mortimer P. Burnett, Lawrenceville, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 393 days.

(21) Appl. No.: 10/180,494

(22) Filed: Jun. 27, 2002

(51) Int. Cl.[7] .............................................. H04M 15/00
(52) U.S. Cl. .............................. 379/112.06; 379/32.03; 379/133
(58) Field of Search ...................... 379/112.06, 112.01, 379/112.08, 126, 133, 135, 137, 138, 139, 379/22, 32.01, 32.02, 32.03, 32.05

(56) References Cited

U.S. PATENT DOCUMENTS

| | | | | |
|---|---|---|---|---|
| 5,475,732 A | * | 12/1995 | Pester, III | 379/32.01 |
| 5,828,729 A | * | 10/1998 | Clermont et al. | 379/32.01 |
| 6,028,914 A | * | 2/2000 | Lin et al. | 379/14 |
| 6,381,306 B1 | * | 4/2002 | Lawson et al. | 379/32.01 |
| 2003/0118169 A1 | * | 6/2003 | Savoor et al. | 379/219 |

* cited by examiner

Primary Examiner—Curtis Kuntz
Assistant Examiner—Barry W Taylor
(74) Attorney, Agent, or Firm—Withers & Keys, LLC

(57) ABSTRACT

A system and method for detection of invalid and undesirable conditions associated with a telephone network. The invalid and undesirable conditions can include, for example, call looping, misrouting, mass calling, and excessive redialing. Initial Address Messages associated with SS7 protocols are captured, parsed, and analyzed for detection of these conditions. A system in accordance with the present invention can be a device external to a switch that generate the messages. Alternatively, a microprocessor of the switch can be adapted to execute instruction sets disclosed in the present invention.

19 Claims, 9 Drawing Sheets

| FROM | >>> | >>> | >>> | TO | Call Digits | Number of calls | Remarks |
|---|---|---|---|---|---|---|---|
| | | | ATLNGAEP01T | 1138196 | 678-378-XXXX | 103 | Note 1 |
| | | ATLNGABU03T | ATLNGAEP01T | | | | Note 1 |
| | NRCRGAMA02T | ATLNGABU03T | | | | | Note1 |
| 1153057 | NRCRGAMA02T | | | | | | Note 1 |
| CRTNGAMA83C | ATLNGAEP01T | | | 1138196 | 678-378-XXXX | 11 | Note 2 |
| BRMNGAES53A | ATLNGAEP01T | | | 1138196 | 678-378-XXXX | 14 | Note 2 |
| NWNNGAMA25C | ATLNGAEP01T | | | 1138196 | 678-378-XXXX | 22 | Note 2 |

Note 1: These cells indicated a call, beginning from the left at point code 1153057, that traversed three tandem switches (NCRCGAMA02T, ATLNGABU03T, and ATLNEP01T). The cells, from left to right (i.e., from the "1153057-NRCRGAMA02T" cell to the "NRCRGAMA02T-ATLNGABU03T" cell to the "ATLNGABU03T-ATLNGAEP01T" cell to the "ATLNGAEP01T-1138196 cell), indicate a "leg" or trunk connection of the call. The fact that it traversed threee tandems instead of two led the inventors (who have knowledge of the local Atlanta tandem network owned by BellSouth) to examine the translations in the NCRCGAMA02T tandem for an error. Indeed, an error was discovered in the translation tables, and the call was routed from NRCRGAMA02T to the ATLNGABU03T incorrectly, which used a trunk resource for each call taking this route (103 discrete calls were captured in this session, using up 103 unnecessary trunks between the tandems).

Note 2: These calls traversed a single tandem switch and completed normally.

KNOWN ART

```
                    Initial Address Message (IAM)

16:48:58 943 ms  Link: 252-9-0>3>252-13-15
  BSN: 55   FSN:28
  SI: ISUP
  SSF: NN   DPC: 252-13-15   OPC: 252-13-94   SLS: 23
  CIC: 1015
  MT: IAM
  Called Party Number Length: 7 octets
    Nature of Address Indicator: National (significant) number
    Address Signal: 6785701234
  Calling Party Number Id
    Nature of Address Indicator: Unique national number
    Address Signal: 7702545678
  Charge Number Id
    Nature of Address Indicator: ANI of the Calling party; national number
    Address Signal: 7702545678
  Jurisdiction Information Id
    Address Signal: 770251
```

FIG. 4

| From | >>> | >>> | >>> | To | Called Digits | Calls |
|---|---|---|---|---|---|---|
| | | ATLNGALCI01 | ATLNGAEP01T | ATLNGAPKDS0 | 404214 | 93 |
| | | ATLNGAPXDS1 | ATLNGAEP01T | | 404214 | 11 |
| | | ATHNGAMADS1 | ATLNGAEP01T | | 404214 | 13 |
| | | ATLNGATL04T | ATLNGAEP01T | | 404214 | 7 |
| | | | ATLNGAEP01T | | 404214 | 22 |
| | | ATLNGATLCM1 | ATLNGABU04T | ATLNGAACCM4 | 404358 | 50 |
| | | ATLNGATL04T | ATLNGABU04T | | 404358 | 7 |
| | | | ATLNGABU04T | | 404358 | 11 |
| | | NRCRGAMA02T | ATLNGABU03T | ATLNGATLCM1 | 404386 | 31 |
| | | NRCRGAMA02T | ATLNGABU03T | | 404386 | 10 |
| | | | | | 404386 | 7 |
| ATLNGACGCM1 | | ATLNGABU03T | NRCRGAMA02T | RSWLGADICM3 | 404423 | 31 |
| | | ATLNGAEP01T | NRCRGAMA02T | | 404423 | 8 |
| | | ATLNGAEP01T | NRCRGAMA02T | | 404423 | 12 |
| ATLNGABU04T | | | | | 404423 | 9 |

FIG. 5

| From | | Call | | Looping | | Condition | To | Called Digits | Calls |
|---|---|---|---|---|---|---|---|---|---|
| Possible | >>> | | >>> | | >>> | ATLNGAUYCM2 | ATLNGABU01T | 706632 | 10 |
| | | | | | | SNMTGAASDS0 | ATLNGABU01T | 706632 | 8 |
| | | | | | | 237001088 | ATLNGABU01T | 706632 | 8 |
| | | | | | | 242001012 | ATLNGABU01T | 706632 | 8 |
| | | | | | | ATLNGABU01T | 242001012 | 706632 | 8 |
| | | | | | | 254052100 | ATLNGABU01T | 706632 | 24 |

FIG. 6

| FROM | >>> | >>> | >>> | TO | Call Digits | Number of calls | Remarks |
|---|---|---|---|---|---|---|---|
| | | | | ATLNGAEP01T | 1138196 | 678-378-XXXX | 103 | Note 1 |
| | | ATLNGABU03T | ATLNGAEP01T | | | | Note 1 |
| | NRCRGAMA02T | ATLNGABU03T | | | | | Note1 |
| 1153057 | NRCRGAMA02T | | | | | | Note 1 |
| CRTNGAMA83C | ATLNGAEP01T | | | | 1138196 | 678-378-XXXX | 11 | Note 2 |
| BRMNGAES53A | ATLNGAEP01T | | | | 1138196 | 678-378-XXXX | 14 | Note 2 |
| NWNNGAMA25C | ATLNGAEP01T | | | | 1138196 | 678-378-XXXX | 22 | Note 2 |

Note 1: These cells indicated a call, beginning from the left at point code 1153057, that traversed three tandem switches (NCRCGAMA02T, ATLNGABU03T, and ATLNEP01T). The cells, from left to right (i.e., from the "1153057-NRCRGAMA02T" cell to the "NRCRGAMA02T-ATLNGABU03T" cell to the "ATLNGABU03T-ATLNGAEP01T" cell to the "ATLNGAEP01T-1138196 cell), indicate a "leg" or trunk connection of the call. The fact that it traversed threee tandems instead of two led the inventors (who have knowledge of the local Atlanta tandem network owned by BellSouth) to examine the translations in the NCRCGAMA02T tandem for an error. Indeed, an error was discovered in the translation tables, and the call was routed from NRCRGAMA02T to the ATLNGABU03T incorrectly, which used a trunk resource for each call taking this route (103 discrete calls were captured in this session, using up 103 unnecessary trunks between the tandems).

Note 2: These calls traversed a single tandem switch and completed normally.

FIG. 7

DETECTION OF COMMON INFORMATION ELEMENTS IN PSTN CALL PROCESSING PATTERNS

FIELD OF THE INVENTION

The present invention relates generally to the field of telecommunications and, more particularly, to systems and methods for detection of invalid and undesirable conditions using common information elements in PSTN call processing patterns.

BACKGROUND OF THE INVENTION

The Public Switched Telephone Network (PSTN) can be inefficient. There are a number of invalid network conditions that consume network resources without providing benefits to the network and indeed may, at times, produce service impairment in the form of blocked calls. In addition, there are a number of valid, yet undesirable, telecommunications events that waste network resources. Examples of these invalid conditions and undesirable events include, for example, call looping, misrouted traffic, unreported mass calling, and excessive redialing.

A call looping condition occurs when a telephone call originated by a calling party to a called party loops on a trunk group between an originating end office ("EO") and a terminating EO multiple times. Such looping condition can occur due to a number of situations including, for example, errors in translation tables that are provisioned at one or both of the EOs. When it occurs, the looping condition uses up multiple members, and perhaps all members, in a trunk group, blocking legitimate calls, resulting in inefficiency and service impairment in the network. When all members in the trunk group between EOs are used as a result, the looping condition results in a reorder, meaning the calling party would hear a 120IPM (or fast busy) signal, and would have to redial the called number. Some of these looping conditions are never noticed by the calling party, however, because a call could ultimately be routed to the desired called party after several looping iterations. Accordingly, many of these conditions have gone undetected and the network has unknowingly wasted its resources. This results in building a larger network, sometimes substantially so, than would otherwise be required by a network provider.

A misrouted traffic condition occurs when a call originated by a calling party to a called party is misrouted to one or more tandem offices that would not normally be involved in completing the call. For example, in a metropolitan area that has five tandem offices, namely, Tandem Offices A through E, a call originated from an originating EO associated with Tandem Office A to a terminating end office associated with Tandem Office E would normally involve resources of one trunk group linking Tandem Office A to Tandem Office E. The misrouted traffic condition occurs when Tandem Office A, instead of routing the call to Tandem office E, misroutes the call to one or more of Tandem Offices B, C, and D. For example, the call may be misrouted such that it "snakes" from Tandem Office A to Tandem Office B, from Tandem Office B to Tandem Office C, from Tandem Office C to Tandem Office D, and finally from Tandem Office D to Tandem Office E, using up resources of four trunk groups. This misrouted traffic condition is also referred to as a "snaking condition" (by the inventors, at least).

A mass calling event occurs when multiple calling parties call a common called party simultaneously, or within a short period of time. One example of such mass calling event is associated with radio station call-ins. For example, when a radio station conducts a survey or a contest during which the general public is invited to call the radio station immediately or within a specific time frame, thousands of telephone calls would be originated by listeners. As known in the art, such mass calling of a common called party results in significant stress to the network, particularly if the radio station does not warn the network provider ahead of time. Such a mass calling event can, among other things, aggravate the call looping and misrouted traffic conditions described above.

An excessive redialing event occurs when a calling party, within a relatively short time frame, repeatedly dials one or more called numbers. For example, excessive redialing can occur when a calling party repeatedly dials the same called number until connected. Redialing can be accomplished either manually or by invoking a feature of the telephone set used by the calling party. Excessive redialing can also occur when the calling party sequentially dials a number of called numbers. This can happen, for example, during a telemarketing campaign in which a computer is used to dial large number of potential customers' telephone numbers. As known in the art, such excessive redialing results in significant stress to the network. Such excessive redialing also aggravates the call looping and misrouted traffic conditions described above. This is most apparent when a Customer Premise Equipment (CPE) device, such as a PBX, uses an ISDN protocol to "flood" network with call setup messages.

Accordingly, these invalid and undesirable conditions use up valuable network resources, and they are costly to telephone networks.

Prior to the present invention, there was no known solution to the problems summarized above. The closest known technology is a switch-based "hop counter" that ensures that a message is not excessively looped under certain conditions. The basic operation of the hop counter can be briefly described as follows. A telephone network provisions a hop counter on a trunk group at a switch, and sets a default number to ten. Each time a call is routed to a network element, which is capable of understanding the hop counter capability, or back to the originating switch, the hop counter is decremented by one. When the call routes for the tenth time, the call is dropped, thereby preventing excessive looping condition. As known in the art, the hop counter does not help detect the root cause of the looping condition, nor does it detect all looping conditions. For example, the hop counter technology that exists today is not capable of finding errors in translation tables, which may cause the looping condition.

SUMMARY OF THE INVENTION

The present invention is a system and method that can be used to detect invalid and/or undesirable conditions associated with a telephone network. The present invention detects, among other conditions, call looping, unreported mass calling, excessive redialing, and misrouted traffic in a telephone network. In a preferred embodiment, the system is adapted to capture, parse, and analyze common information elements of Initial Address Messages (IAMs) in an SS7 signaling network. Other switch-based call records may be utilized as well. Using the common information elements associated with the IAMs, the present invention can detect invalid and undesirable network inefficiencies in different types of telephone networks, including for example, wireline, wireless, or hybrid networks.

A preferred method that is adapted to detect a looping condition can be implemented as follows. First, a number of IAMs generated by a switch are captured. Second, a calling or called telephone number is extracted from the IAMs for analysis. Third, using a "rule-based" sorting and analysis, a looping condition to a particular central office (i.e., one associated with a unique NPA/NXX) is detected. This software methodology has been successfully tested using an external computer connected to the switch.

As detailed below, the present invention can be adapted to detect more than one invalid or undesirable conditions associated with the telephone network. Invalid conditions that can be detected include, for example, looping conditions associated with trunk groups between two switching centers as well as multi-way looping conditions between two or more trunk groups or two or more switching centers. Valid, yet undesirable, conditions that can be detected using the present invention include, for example, mass calling to/from a single number as well as excessive redialing, either manually or automatically. Each of the detections can be implemented based on call volume or other user-definable parameters.

Another preferred embodiment of the present invention is a switch-based solution. For example, a switch manufacturer like Lucent Technologies or Nortel Networks could incorporate an embodiment of the present invention in its switches.

BRIEF DESCRIPTION OF THE DRAWINGS

FIG. 4 is an exemplary IAM showing the common information elements associated with the IAM.

FIG. 5 is an exemplary report generated in accordance with the teaching of the present invention.

FIG. 6 is another exemplary report generated in accordance with the teaching of the present invention.

FIG. 7 is another exemplary report generated in accordance with the teaching of the present invention.

DETAILED DESCRIPTION OF THE INVENTION

In the telecommunications field, it is generally known that a number of different messages can be used to support call setup based on SS7 protocols. The messages include Initial Address Messages ("IAMs"), Address Complete Messages ("ACMs"), Answer Messages ("ANMs"), Release Messages ("RELs"), and Release Complete Messages ("RLCs"). Information regarding these messages are described below. The three paragraphs that follow immediately below are substantially verbatim to those described in Bellcore Publication No. SR-TSV-002275, Issue 2, April 1994, on page 14-11 through page 14-13.

An IAM is a mandatory message that is sent in the forward (outbound) direction to initiate seizure of an outgoing circuit and to transmit address and other information relating to the routing and handling of a call. The ACM is a message sent in the backward (inbound) direction indicating that all the address signals required for routing the call to the called party have been received. The ANM is a message sent in the backward direction indicating that the call has been answered. The REL is a message sent in either direction indicating that the circuit identified in the message is being released due to the reason or cause supplied and is ready to be put in the idle state on receipt of the RLC. The RLC is a message sent in either direction in response to the receipt of an REL.

Figure 1:
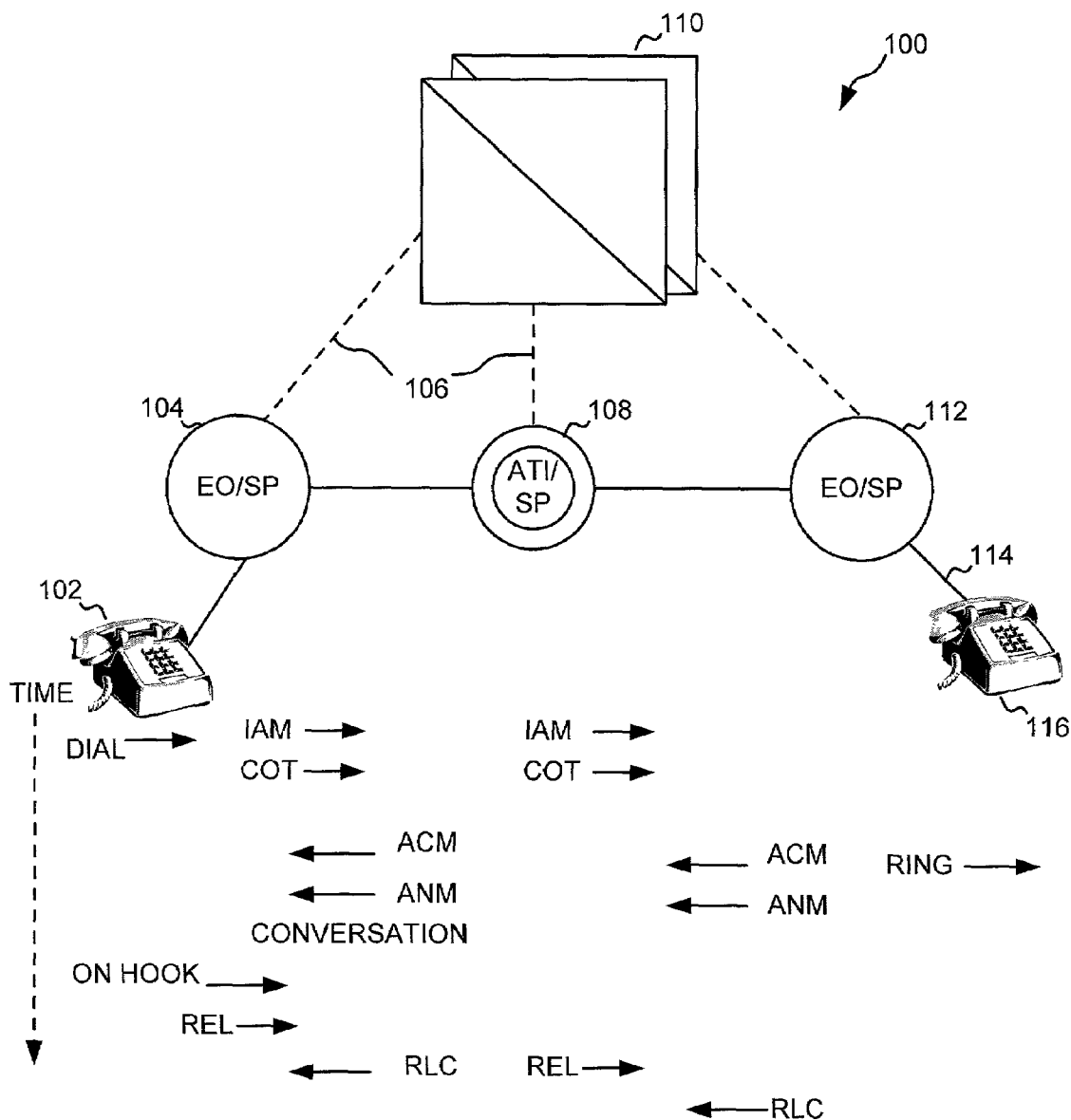
FIG. 1 is a schematic diagram showing a PSTN layout and the sequence of messages exchanged between two end offices.

FIG. 1 is adapted from FIG. 14-4 of Publication No. SR-TSV-002275. FIG. 1 shows the sequence in which the messages used for setup of an intraLATA interoffice call are generated. This call scenario is for an intraLATA call switched through an Access Tandem (AT) where a Continuity Check Message (COT) is required.

Referring to FIG. 1, when a customer uses telephone 102 to dial an intraLATA interoffice call, originating EO 104 sends an IAM over SS7 signaling links 106 to AT 108 via STP pair 110. AT 108 then sends an IAM to terminating EO 112 indicating the circuit to be used for the call between AT 108 and EO 112. When terminating EO 112 receives the IAM and the COT, it sends an ACM to AT 108 and causes called party's telephone 116 to ring. When AT 108 receives the ACM, it sends an ACM to originating EO 104. When telephone 116 of the called party goes off-hook, an ANM is sent from terminating EO 112 to AT 108. When AT 108 receives the ANM, it sends an ANM to originating EO 104. After the calling and called party finish their conversation, one party will go on-hook. If the calling party goes on-hook, originating EO 104 sends an REL to AT 108. When AT 108 receives the REL, it sends an RLC to originating EO 104, and sends an REL to terminating EO 112. When terminating EO 112 receives the REL, it sends an RLC to AT 108.

A preferred embodiment of the present invention includes several basic steps. First, IAMs generated by a switch are captured. Second, the IAMs are parsed so that common information elements can be extracted. Third, the common information elements are analyzed to determine whether the switch is affected by an invalid or undesirable condition. Fourth, appropriate corrective actions can be taken. Preferably, these basic steps and any additional steps discussed below are instruction sets that can be executed by a microprocessor. As described below, the microprocessor can be part of a device that is external to the switch. In other words, the present invention can be adapted as a device independent of the switch, but which can be used to capture and analyze IAMs generated by the switch. Alternatively, the microprocessor can either be an existing or an additional microprocessor of the switch adapted to execute the instruction sets.

Figure 2:
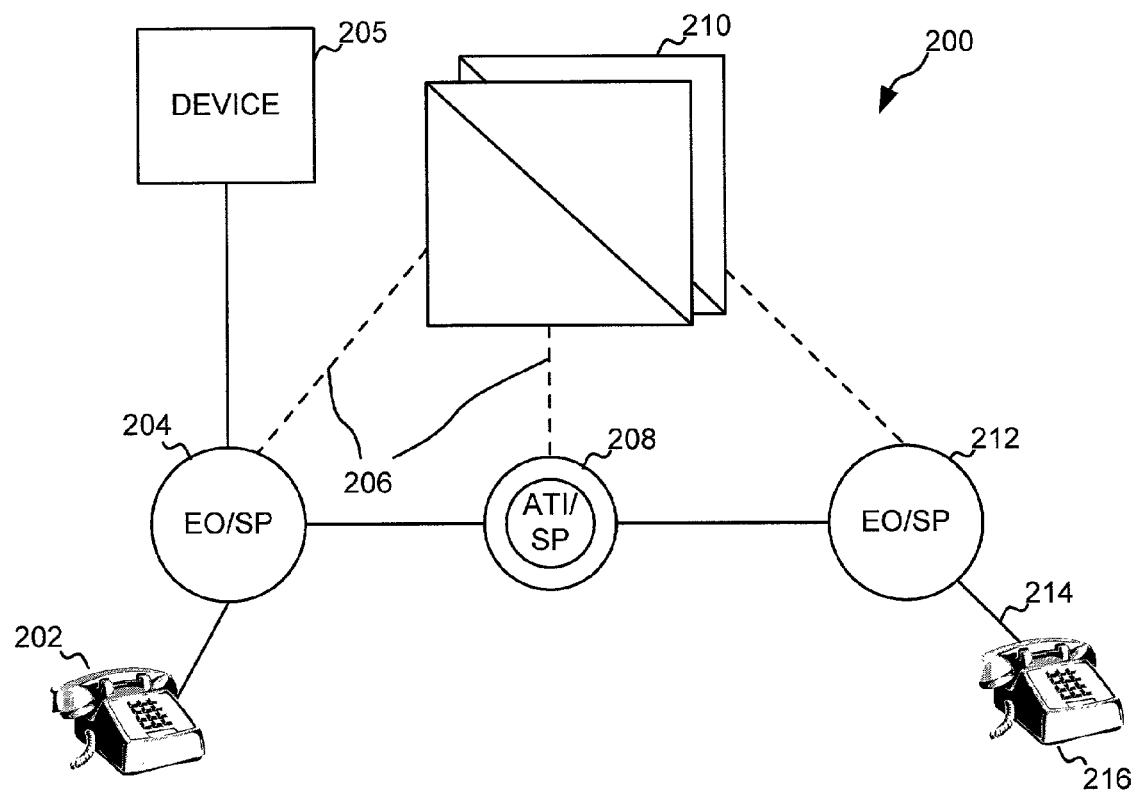
FIG. 2 is a schematic diagram showing the system architecture used in a preferred embodiment of the invention.

FIG. 2 is a schematic diagram showing the system architecture of a preferred embodiment of the invention. Network 200 is a telephone network in which a system of the present invention could be implemented. Network 200 could be, for example, a PSTN. It is noted that one of ordinary skill in the art can adapt the teaching of the present invention for other telephone networks including, for example, an Advanced Intelligent Network (AIN), a wireless network, and the like. Components 202 through 216 shown in FIG. 2 are similar to corresponding components shown in FIG. 1.

Device 205 includes a microprocessor that can execute instruction sets. Device 205 is adapted to monitor and capture the SS7 messaging originating and terminating between EO 204, AT 208, and EO 212. The messaging can be captured with any commercially available protocol device, such as a Agilent, formerly Hewlett-Packard, "Access 7" system, via a hardware bridge. Alternatively, a switch-based implementation could be provided via a software bridge in either the end office switch or Signal Transfer Point (STP) 210. Preferably, device 205 includes a printer from which reports can be output.

Figure 3A:
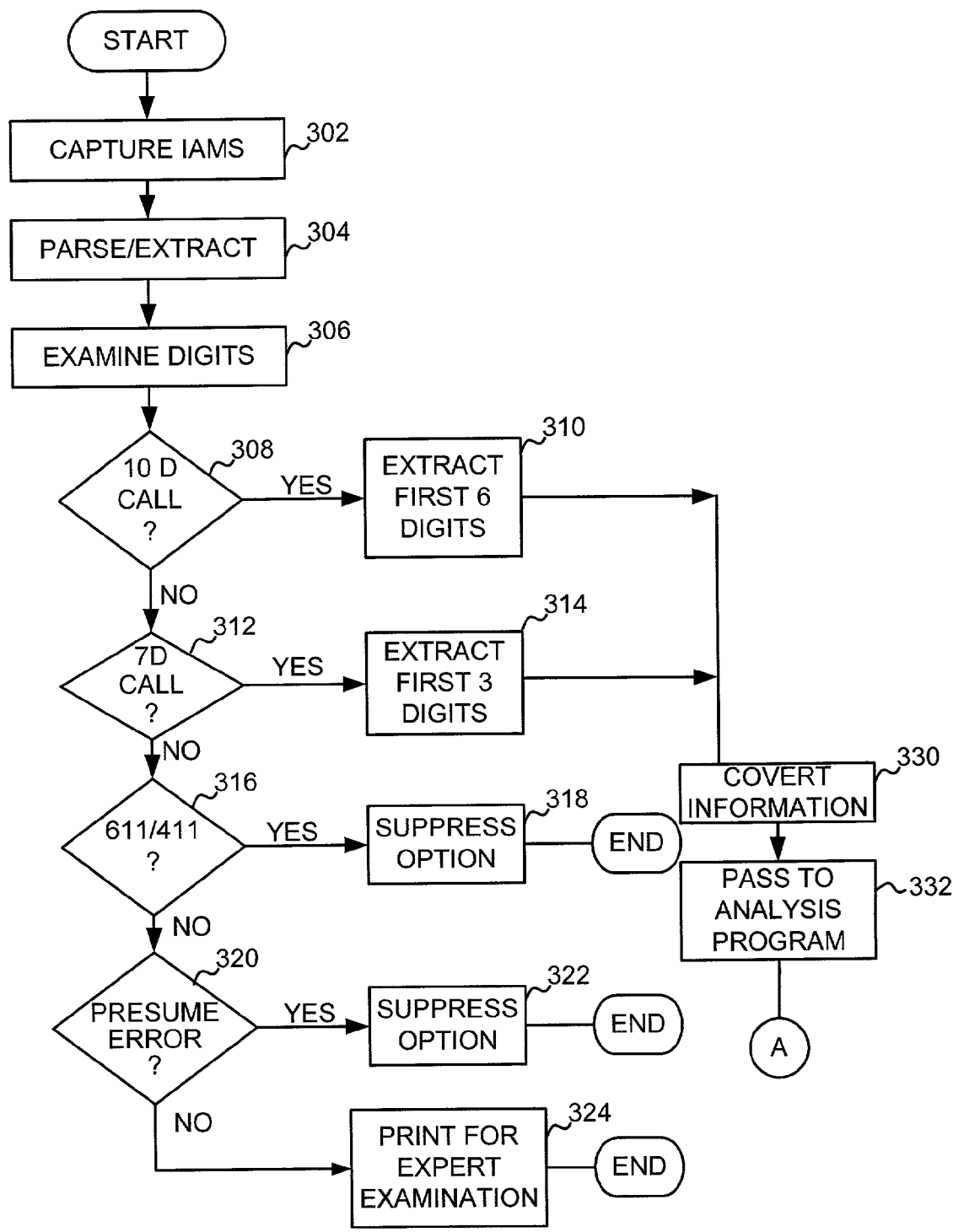
FIGS. 3A through 3C are collectively a flow diagram illustrating exemplary steps that could be used to implement a preferred embodiment of the invention.
Figure 3B:
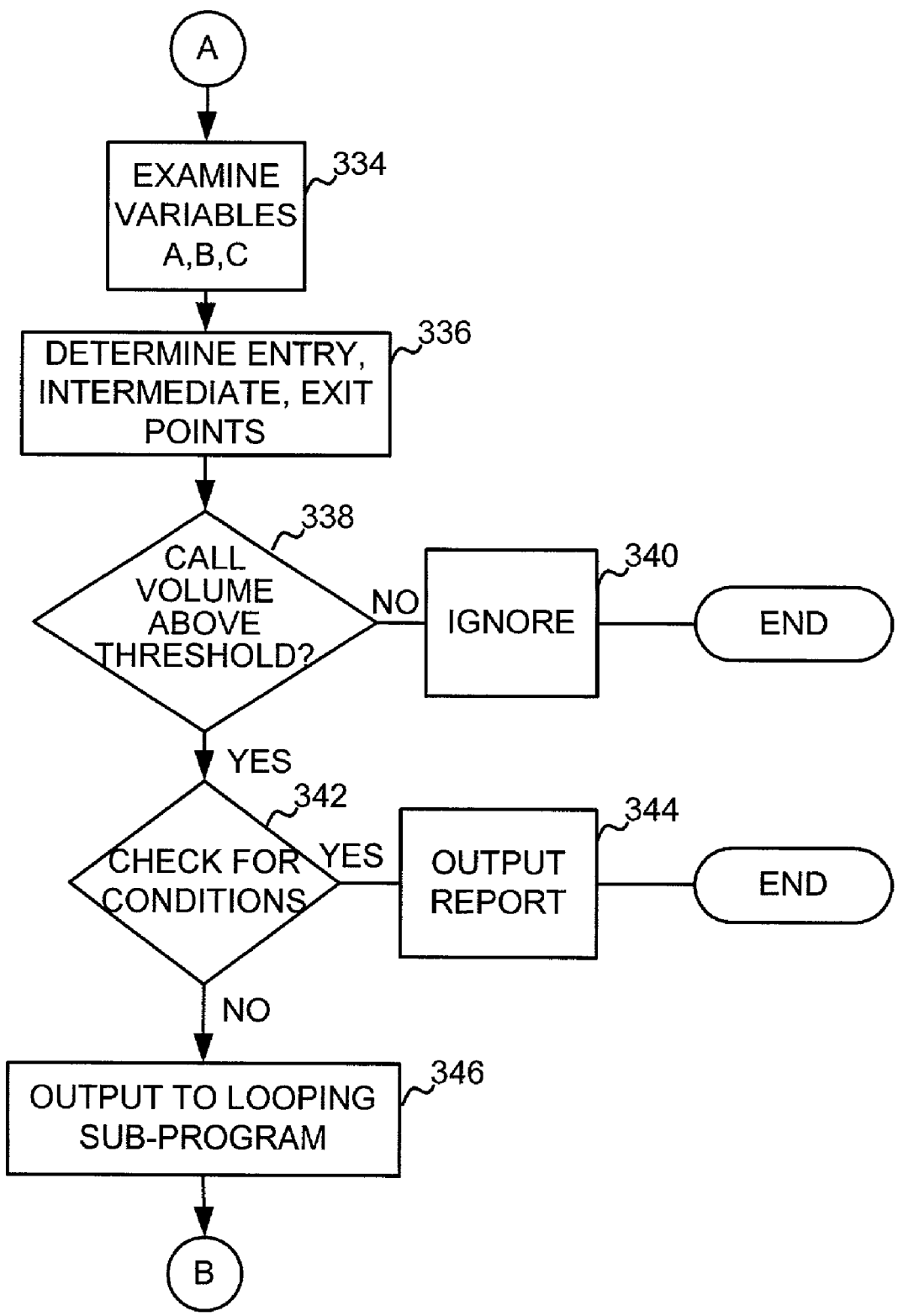
Figure 3C:
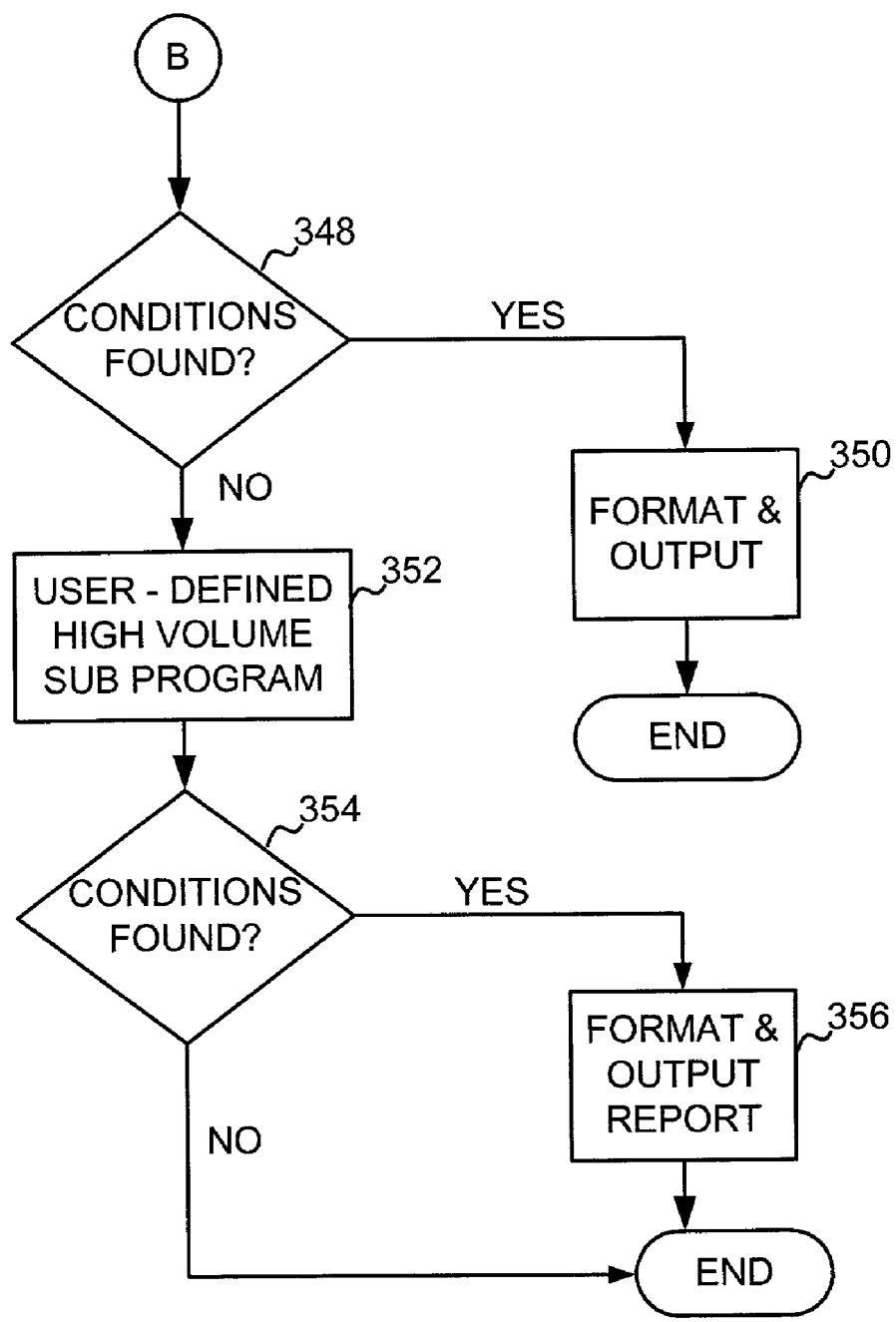

To determine whether EO 204 is suffering from any invalid or undesirable conditions during call processing, device 205 can be adapted to perform the exemplary steps shown in FIGS. 3A through 3C, which are collectively a flow diagram illustrating a preferred embodiment of the invention.

In step 302, a number of IAMs generated by EO 204 are captured by device 205. The number of IAMs can be a fixed number, e.g., 100 messages. Alternatively, the number of IAMs can be all that were generated during a specific time duration, e.g., 20 minutes. The IAMs can be captured using other user-definable settings. As a general rule, the higher the number of messages captured the better the analysis will be. The messages can be captured during a specific time period, and this will likely be during a high traffic period or when a specific trouble is occurring. The number of messages and the time period is generally limited by the buffer size and real time availability of the device storing the captured messages. It has been shown that messages captured for about three to five minutes were sufficient for analysis.

In step 304, the IAMs are parsed. Different types of common information elements associated with the IAMs can be extracted during parsing. The common information elements can include, for example, one or more of routing destination, originating point code (OPC), and destination point code (DPC). FIG. 4 is an exemplary IAM showing the common information elements. As one of ordinarily skill in the art would easily understand the information shown in FIG. 4, detailed description is not provided here.

In step 306, a telephone number contained within the IAMs is examined. The telephone number can be a dialed number or a number associated with the calling party, depending which number is to be used to detect the conditions. As known in the art, in the United States of America, a dialed telephone number may have seven digits, ten digits, or more than ten digits (presuming an access or country code, depending on whether it is a local call, a long distance call, a call dialed from within a company or hotel, or an international call).

In step 308, it is determined whether the telephone number is a 10-digit number. If so, the process continues in step 310. Otherwise, the process goes to step 312.

In step 310, the first six digits of the telephone number (i.e., the NPA and the NXX components) are extracted, and the process continues in step 330, which will be described in greater details below.

In step 312, it is determined whether there are seven digits in the telephone number. If so, the process continues in step 314. Otherwise, the process goes to step 316.

In step 314, the first three digits of the telephone number (the NXX component) is extracted, and the process continues in step 330, which will be described in greater details below.

In step 316, it is determined whether the telephone number is one of 411, 611, 911 or other specially reserved numbers, or the like. If so, the process goes to step 318. Otherwise, the process goes to step 320.

In step 318, the option for analyzing the IAMs can be suppressed. In other words, 611 (repair service), 411 (directory assistance) or the like can be optionally bypassed from analysis.

In step 320, it is determined whether an error is presumed. For example, since it is possible to initiate a call using a dialed string other than three digit (e.g., 411), seven digits (e.g., 555-1212), and ten digits (e.g., 404-555-1212), the invention can be adapted to presume that the digits analyzed here are invalid if they fail to meet the three conditions in steps 308, 312, and 316 above. If the error is presumed the process goes to step 322. Otherwise, the process goes to step 324.

In step 322, the option is suppressed, and the process ends.

In step 324, if the error is not presumed, a user of the invention can determine whether to examine calls initiated using a dial string other than ten or seven digits. For example, a report can be printed in step 324 for analysis. The report can be examined either manually by an expert person, or automatically by an expert system. The process ends after step 324. An automated process could examine the output for a "repeated" digit string and present it for an expert. FIG. 5 is an example of a report generated in accordance with the teaching of the present invention. The exemplary report shown in FIG. 5 does not indicate any possible call looping conditions, however.

FIG. 6 shows a report that indicates a call looping condition. There is a loop between ATLNGABU01T and point code 242001012 (in this specific example, point code 242001012 was not defined in the point code to CLLI cross reference table). An inspection of the volume of calls (see the far right column in FIG. 6) indicates that ATLNGABU01T is limiting some of the calls.

In step 330, the first six digits of the telephone number that were extracted in step 310 or the first three digits that were extracted in step 314 are passed to a table or a conversion program. Here, a point code is converted to a common language identifier. The point code, either originating or destination, is converted based on a "look up" basis to a common language identifier. The common language identifier may be, for example, "The Tandem No. 2 of the Norcross Ga. central office," which is shown as "NRCRGAMA02T" in FIG. 7.

In step 332, the common language identifier replaces the originating or destination point codes in the analysis program. The process examines three variables (which are parsed from the captured IAM messages): (1) call volume; (2) number of central office entry/exit points; and (3) number of tandem switches. All three variables are "user-definable" (based on network configuration). While the conditions are user-definable, the most common means for the presence of a looping condition is testing for a call that transits at least three central offices and one tandem switch; or two central offices and two tandem switches. The output of the analysis tool, to an expert user, identifies a multi-way or "snaking condition" between the end offices or between end offices and tandems, or between tandems (see example shown in FIG. 7). As explained in Note 1 of FIG. 7, these cells demonstrate that a call which begins from the left at point code 1153057 and traverses the three tandem switches (namely, NRCRGAMA02T, ATLNGABU03T, and ATLNGAEP01T) should have really transited just two tandems. The call segment that is in error is the portion from ATLNGABU03T to ATLNGAEP01T. The actual mis-routing occurs at the tandem switch directly in front of this leg at the NRCRGA02T. This was apparent by expert analysis of the translation tables after the tool identified this possible error. What is different and unique about this tool is that it allows for easy, quick, and precise identification. Individuals usually avoid daily examination of translation tables in telephone switching systems because complexity and time consumption alone prevent it. An end-user customer of the telephone company (such as BellSouth) may not have reported it as a trouble condition since the call completed to the intended destination even though it may have taken a fraction of a second longer to complete, but that is an acceptable delay for the end user. In the example shown in FIG. 7, the call consumed 103 discrete trunks (or transmission channels) and processing time between the misrouted tandems, which is a considerable cost.

FIG. 3B is a continuation of FIG. 3A at connector A. In step 334, a number of variables associated with calls passed to the analysis program are examined. The variables could be, for example, call volume, number of central offices (entry/exit points), and the number of tandems involved in the IAMs. These three exemplary variables are "user definable." These variables are the most common ones that can be used to find looping and snaking conditions. Other variables exist.

In step 336, the entry, intermediate, and exit points are determined. It is in this step that undesirable conditions are checked.

In step 338, the call volume is checked. If the call volume does not meet certain threshold then the process goes to step 340, otherwise, the process goes to step 342. The threshold is a user-definable variable. For example, an appropriate threshold can be a number in the large of six to ten from a calling or called number. It is preferable that the threshold be not lower than six.

In step 340. The IAMs are ignored, and the process ends.

In step 342, the existence of invalid or undesirable conditions is determined. A condition can be defined in one of several ways. For example, a multi-way or snaking condition can be defined as one that involves at least three central offices and one tandem switch. Another condition can be defined as one that involves at least two central offices and two tandem switches. Other user-defined conditions are possible. If any such condition is found, the process goes to step 344. Otherwise, the process goes to step 346.

In step 344, a report is output, and the process ends. The report can be formatted similar to that shown in FIGS. 5, 6, or 7.

In step 346, the output is provided to a looping subprogram, and the process goes to step 348 shown in FIG. 3C via connector B. The "looping" subprogram is an iterative process to examine and parse the IAM information captured.

Referring now to FIG. 3C, which is a continuation of FIG. 3B at connector B. In step 348, a number of conditions can be checked. For example, the program can be adapted to check for undesirable conditions. A condition may be considered undesirable if it involves, for example, (1) one tandem with a single entry and exit point, which is a straight looping condition; (2) one tandem with two entry/exit points that "ping pong" (or volley) the same call between them using the tandem; or (3) other user definable patterns of central office and tandem combinations. If any of such conditions is met, the process goes to step 350. Otherwise, the process goes to step 352.

In step 350, the information is formatted and output, and the process ends. An exemplary output of step 350 is shown in FIG. 7, which demonstrates legitimate calls and a misrouted call as well.

In step 352, the process is processed by a user-defined high volume sub-program. Again, the range of six to ten calls from or to the same number can be used as a user-defined volume. The subprogram examines whether the number of calls originating from the same number or to the same number exceeds six.

In step 354, other conditions are checked. For example, mass calling or excessive redialing conditions may be checked. The checking can be performed by, for example, (1) setting the call volume level, and (2) examining output or common pattern of originating or terminating digit analysis. Manual expert analysis can follow. If any such condition is met, the process goes to step 356, otherwise, the process ends.

In step 356, the information is formatted and output, and the process ends.

It is noted that a switch manufacturer may adapt its switches to perform the processes described above. For example, a switch manufacturer could adapt a switch to capture the IAM messages and parse them on-board the switching platform. This would allow a "seamless" processing, possibly even in "real time," rather than a capture and then post-processing the information.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for detecting conditions associated with a telephone network comprising the steps of:
   capturing IAMs generated by a switch;
   parsing the IAMs for common information elements; and
   analyzing the common information elements of the IAMS without checking for an overflow condition to determine an invalid condition by identifying a pre-defined number of central offices and tandem switches in use for a given call where the identified pre-defined number of central offices and tandem switches is indicative of the invalid condition.

2. The method of claim 1, wherein the invalid condition is one of a call looping condition and a snaking condition.

3. The method of claim 1, wherein the step of capturing involves a specific number of IAMs.

4. The method of claim 1, wherein the step of capturing involves a variable number of IAMs.

5. The method of claim 1, wherein the step of capturing involves IAMs generated by the switch within a predetermined amount of time.

6. The method of claim 1, wherein a number of IAMs captured is dependent upon call volume associated with the switch.

7. The method of claim 1, wherein a number of IAMs captured is dependent upon a buffer size of a storage device associated with the switch.

8. The method of claim 1, wherein the invalid condition is one of a call looping condition and a snaking condition.

9. The method of claim 8, where the pre-defined number is at least three central offices and one tandem switch.

10. The method of claim 8, wherein the pre-defined number is at least two central offices and two tandem switches.

11. A device for detecting invalid and undesirable conditions associated with a telephone network comprising:
   a microprocessor adapted to communicate with a switch; and
   instruction sets executable by the microprocessor, wherein the instruction sets comprises capturing IAMs generated by the switch, parsing the IAMs for common information elements, and analyzing the common information elements of the IAMS without checking for an overflow condition to determine an invalid condition by identifying a pre-defined number of central offices and tandem switches in use for a given call where the identified pre-defined number of central offices and tandem switches is indicative of the invalid condition.

12. The device of claim 11, wherein the invalid condition is one of a call looping condition and a snaking condition.

13. The device of claim 11, wherein the microprocessor is connected to the switch using a bridging functionality associated with a protocol analyzer.

14. The device of claim 11, further comprising a printer in communication with the microprocessor, wherein the microprocessor and the printer are adapted to generate a report.

15. The device of claim 14, where the report includes information associated with one or more switches through which a call routes.

16. A method for detecting conditions associated with a telephone network comprising the steps of:
   capturing IAMs generated by a switch;
   selecting a telephone number from the IAMs; and
   analyzing the common information elements of the IAMs to identify an undesirable condition by identifying a single entry and exit point of a tandem switch in use for calls corresponding to the IAMS where the single entry and exit point of the tandem switch is indicative of the undesirable condition.

17. The method of claim 16, wherein the undesirable condition is one of a mass calling condition and an excessive redialing condition.

18. The method of claim 17, wherein the undesirable condition is further identified by identifying a user definable patterns of central offices and tandem switch combinations.

19. A switch in a telephone network comprising:
   a microprocessor; and
   instruction sets executable by the microprocessor,
   wherein the instruction sets comprises capturing IAMs generated by the switch, parsing the IAMs for common information elements, and analyzing the common information elements for an undesirable condition by identifying two entry and exit points of a tandem switch in use for calls corresponding to the IAMS where it is identified that a given call is volleyed between the two entry and exit points to indicate the undesirable condition.

\* \* \* \* \*